US006714486B2

(12) United States Patent
Biggs

(10) Patent No.: US 6,714,486 B2
(45) Date of Patent: Mar. 30, 2004

(54) SYSTEM AND METHOD FOR CUSTOMIZED TIME DISPLAY

(76) Inventor: Kevin Biggs, 878 Davenport Road, Toronto, Ontario (CA), M6G 2B6

( * ) Notice: Subject to any disclaimer, the term of this patent is extended or adjusted under 35 U.S.C. 154(b) by 0 days.

(21) Appl. No.: 09/893,583

(22) Filed: Jun. 29, 2001

(65) Prior Publication Data

US 2003/0002391 A1 Jan. 2, 2003

(51) Int. Cl.[7] ........................ G04C 19/00; G04C 11/02; G04B 47/00; G05B 11/01

(52) U.S. Cl. ............................ 368/82; 368/10; 368/47; 700/16

(58) Field of Search ............................ 368/10, 12, 41, 368/47, 72–73, 82; 700/16

(56) References Cited

U.S. PATENT DOCUMENTS

| | | | | | |
|---|---|---|---|---|---|
| 2,837,838 | A | * | 6/1958 | Lewis | 434/304 |
| 4,303,996 | A | | 12/1981 | Schmitz | |
| 4,397,565 | A | | 8/1983 | Ota | |
| 4,531,841 | A | | 7/1985 | Puff | |
| 4,742,501 | A | | 5/1988 | Coster | |
| 5,245,590 | A | | 9/1993 | Galison | |
| D348,020 | S | | 6/1994 | Coster | |
| D348,021 | S | | 6/1994 | Coster | |
| 5,796,945 | A | | 8/1998 | Tarabella | |
| 5,838,643 | A | | 11/1998 | Reiner | |
| 5,850,220 | A | | 12/1998 | Motai | |
| 5,855,006 | A | | 12/1998 | Huemoeller et al. | |
| 5,892,519 | A | | 4/1999 | Hirai | |
| 5,898,645 | A | * | 4/1999 | Sugiyama | 368/82 |
| 5,930,501 | A | | 7/1999 | Neil | |
| 5,995,456 | A | | 11/1999 | Brewer | |
| 6,014,135 | A | | 1/2000 | Fernandes | |
| 6,158,884 | A | * | 12/2000 | Lebby | 368/282 |
| 6,229,430 | B1 | * | 5/2001 | Smith Dewey | 340/286.02 |
| 6,238,084 | B1 | * | 5/2001 | Blotky | 368/294 |
| 6,307,813 | B1 | | 10/2001 | Leggio | |
| 6,449,219 | B1 | * | 9/2002 | Hepp et al. | 368/16 |
| 2001/0004397 | A1 | * | 6/2001 | Kita | 381/334 |
| 2002/0021622 | A1 | * | 2/2002 | Baroche | 368/10 |

FOREIGN PATENT DOCUMENTS

| | | | |
|---|---|---|---|
| DE | 197 47 879 | A1 | 4/1999 |
| EP | 0733983 | A2 | 9/1996 |
| JP | 57163891 | A | 10/1982 |
| WO | WO 02/069313 | A2 | 9/2002 |

OTHER PUBLICATIONS

Nossiter, Joshua C., "Using EXCEL 5 for Windows(TM)", 1995, pp. 187–220, Que Corp., Indianapolis.

* cited by examiner

*Primary Examiner*—David Martin
*Assistant Examiner*—Michael L. Lindinger
(74) *Attorney, Agent, or Firm*—John R. S. Orange; Santosh K. Chari; Linda Kurdydyk

(57) ABSTRACT

A system and method for producing and displaying chronological data according to user specified parameters. The system incorporates language, multi media, and animation into a time display device. The system can include typical features of a conventional time display device, such as an alarm function and a display face. The system also includes a translation engine for combining the parameters and a plurality of supplemental display data, including language, multi media, and animation data, to provide a translation template. The template helps to control the presentation of chronological data in a synchronized fashion by reformatting the chronological data into a translated display format, thereby providing to the user a personalized time display. The display includes selected images and/or language to represent the passage of numerical chronological data. The parameters and the supplemental display data are alterable by the user to customize the presentation of the translated format on the display, so as to present a unique and personalized time display sequence on the display device.

11 Claims, 12 Drawing Sheets

| | | | | | | |
|---|---|---|---|---|---|---|
| GuiTime | Ten Thirty | Ten Thirty * | Ten Thirty * * | Ten Thirty * * * | Ten Thirty * * * * | Ten Thirty~Five |
| AlphaTime | Ten Thirty | Ten Thirty~One | Ten Thirty~Two | Ten Thirty~Three | Ten Thirty~Four | Ten Thirty~Five |
34 36 22a 22b 38 22c 22d 22e 22f 32
Figure 2a
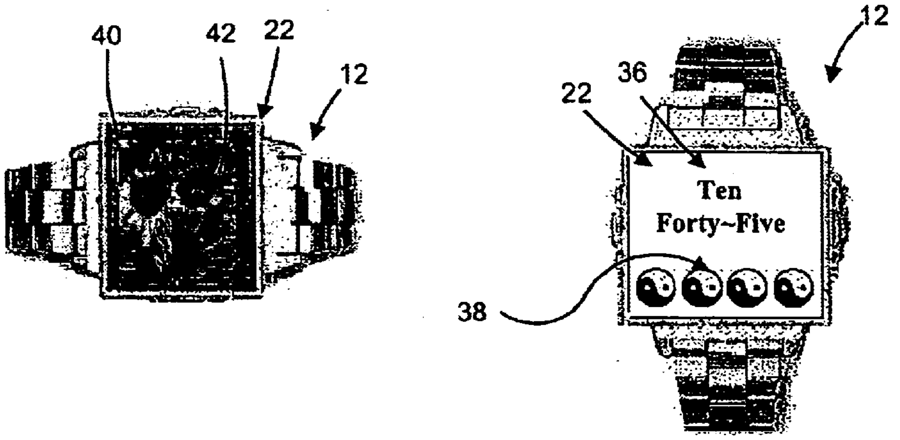
Figure 2b
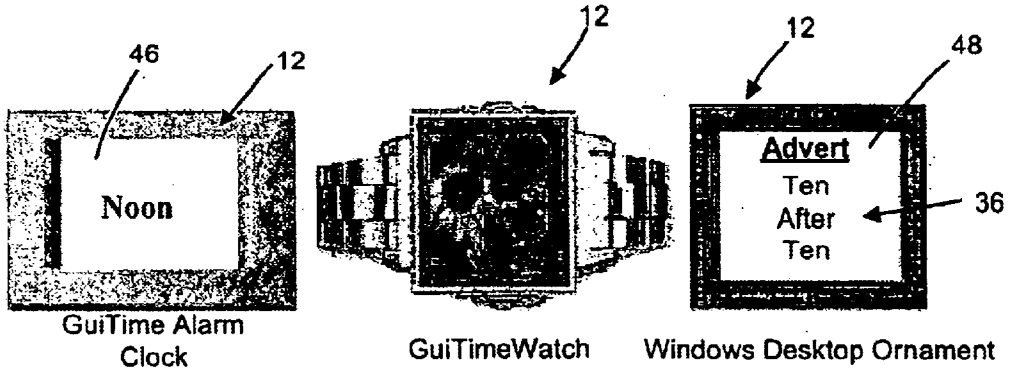
Figure 2c

200

Variables

| Var | Name | Source |
|---|---|---|
| Px | - Presentation | Alpha Code |
| $ | - Schema | Alpha Code |
| # | - Top of the Hour | System clock input / Alpha Code |
| B | - Background | BMP, Gif Etc |
| F | - Frame - | Win or Bit Map Etc |
| D | - Default | Alpha Code |
| is | - Icon Schema | Alpha Code |
| ix | - Icon Group | ICO or BMP, Etc |
| icx | - Icon Selection | ICO or BMP Etc |

204

Presentation

| Variables | | | Presentation |
|---|---|---|---|
| F | B | $ | GuiTime Presentation |
| Fx | Bx | $ or # | Half |
| | | # or $ | Past |
| | | | Eight |
| | | isx or (I1 or I2 or I3 or I4) | * * |

202

| Px | $ | is x | I x | ic-x | Frame/Boarder | B |
|---|---|---|---|---|---|---|
| Presentation | P1 + P2 | P2 | P2 | P2 | P1 + P2 | P1 + P2 |
| P1 - AlphaTime | $1 Military | is1 Watermelon | i1=(ic1) | ic1 | F1 - Wood Nub | B1 - Color |
| P2 - GUITIME | $2- Analog | is 2Globe | i2=(ic1+ic2) | ic2 | F2 -Windows Boarder | B2 - Brick Wall |
| | $3 Slang | is 3Corp logo | i3=(ic1+ic2+ic3) | ic3 | F3 - AlphaTime | B3 - AlphaTime |
| | $4 Cool | | I4=(ic1+ic2+ic3+ic4) | ic4 | | |
| | $5 O'English | | | | | |
| | $6 Swiss | | | | | |
| | | | | | | |

Figure 8

| is x | ig x | ic x |
|---|---|---|
| AlphaTime | i1=(ic1) | ic1= |
| | i2=(ic1+ic2) | ic2= |
| | i3=(ic1+ic2+1c3) | ic3= |
| | 14=(ic1+ic2+ic3+ic4) | ic4= α |

206

Sample Groups

GUITIME Default

Love

Deck

Astrology

Belief

Bad

*Schema – $Dial One Analogue*

210

| | | | | | | | |
|---|---|---|---|---|---|---|---|
| 0 | | 15 | quarter after | 30 | half past | 45 | quarter to |
| 1 | after | 16 | sixteen after | 31 | thirty one | 46 | fourteen to |
| 2 | after | 17 | seventeen after | 32 | thirty two | 47 | thirteen to |
| 3 | after | 18 | eighteen after | 33 | thirty three | 48 | twelve to |
| 4 | after | 19 | nineteen after | 34 | thirty four | 49 | eleven to |
| 5 | after | 20 | twenty after | 35 | thirty five | 50 | ten to |
| 6 | after | 21 | twenty one | 36 | thirty six | 51 | nine to |
| 7 | after | 22 | twenty two | 37 | thirty seven | 52 | eight to |
| 8 | after | 23 | twenty three | 38 | thirty eight | 53 | seven to |
| 9 | after | 24 | twenty four | 39 | thirty nine | 54 | six to |
| 10 | ten after | 25 | twenty five | 40 | twenty to | 55 | five to |
| 11 | eleven after | 26 | twenty six | 41 | nineteen to | 56 | four to |
| 12 | twelve after | 27 | twenty seven | 42 | eighteen to | 57 | three to |
| 13 | thirteen after | 28 | twenty eight | 43 | seventeen to | 58 | two to |
| 14 | fourteen after | 29 | twenty nine | 44 | sixteen to | 59 | one to |

Figure 10

*Schema - $Military Two*

212

| | | | | | | | |
|---|---|---|---|---|---|---|---|
| 0 | | 15 | fifteen | 30 | thirty | 45 | forty five |
| 1 | O' | 16 | sixteen | 31 | thirty one | 46 | forty six |
| 2 | O' | 17 | seventeen | 32 | thirty two | 47 | forty seven |
| 3 | O' | 18 | eighteen | 33 | thirty three | 48 | forty eight |
| 4 | O' | 19 | nineteen | 34 | thirty four | 49 | forty nine |
| 5 | O' | 20 | twenty | 35 | thirty five | 50 | fifty |
| 6 | O' | 21 | twenty one | 36 | thirty six | 51 | fifty one |
| 7 | O' | 22 | twenty two | 37 | thirty seven | 52 | fifty two |
| 8 | O' | 23 | twenty three | 38 | thirty eight | 53 | fifty three |
| 9 | O' | 24 | twenty four | 39 | thirty nine | 54 | fifty four |
| 10 | Ten | 25 | twenty five | 40 | forty | 55 | fifty five |
| 11 | Eleven | 26 | twenty six | 41 | forty one | 56 | fifty six |
| 12 | Twelve | 27 | twenty seven | 42 | forty two | 57 | fifty seven |
| 13 | Thirteen | 28 | twenty eight | 43 | forty three | 58 | fifty eight |
| 14 | Fourteen | 29 | twenty nine | 44 | forty four | 59 | fifty nine |

Figure 11

*Schema - $Cool*

214

| | | | | | | | |
|---|---|---|---|---|---|---|---|
| 0 | | 15 | quarter pas | 30 | half pas | 45 | quarter ta |
| 1 | pas | 16 | sixteen | 31 | thirty one | 46 | fourteen ta |
| 2 | pas | 17 | seventeen | 32 | thirty two | 47 | thirteen ta |
| 3 | pas | 18 | eighteen | 33 | thirty three | 48 | twelve ta |
| 4 | pas | 19 | nineteen | 34 | thirty four | 49 | eleven ta |
| 5 | pas | 20 | twenty pas | 35 | thirty five | 50 | ten ta |
| 6 | pas | 21 | twenty one | 36 | thirty six | 51 | nine ta |
| 7 | pas | 22 | twenty two | 37 | thirty seven | 52 | eight ta |
| 8 | pas | 23 | twenty three | 38 | thirty eight | 53 | seven ta |
| 9 | pas | 24 | twenty four | 39 | thirty nine | 54 | six ta |
| 10 | ten pas | 25 | twenty five | 40 | twenty ta | 55 | five ta |
| 11 | elevenr pas | 26 | twenty six | 41 | nineteen ta | 56 | four ta |
| 12 | twelve pas | 27 | twenty seven | 42 | eighteen ta | 57 | three ta |
| 13 | thirteen pas | 28 | twenty eight | 43 | seventeen ta | 58 | two ta |
| 14 | fourteen pas | 29 | twenty nine | 44 | sixteen ta | 59 | one ta |

Figure 12

SYSTEM AND METHOD FOR CUSTOMIZED TIME DISPLAY

The present invention relates to a system and method for producing and displaying customized presentations of chronological data.

BACKGROUND OF THE INVENTION

Time display devices are used by many people to keep track of the passage of time during daily activities. Conventional electronic time pieces typically provide time keeping functions and can display additional information for indicating years, months, days, and dates. Alternatively, the time keeping functions can also include an alarm function and counter functions in addition to the basic display of actual time and hours, minutes, and seconds.

Watches and clocks are usually designed with graduations that are marked around the face of the time piece, internal mechanisms that rotate an hour hand, minute hand, and a second hand. The design of the watch face has on its perimeter the numbers 1 through 12, usually increasing in a clockwise direction with rotating hour hands and minute hands that point to the numbers on the watch face parameter that indicate the exact time of day. This time keeping system can be implemented in either an analog or digital manner. Furthermore, the use of digital numbering systems to indicate time are also known. However, the user of a time display device may wish to have animated or otherwise customizable display functions to provide for the passage of time, in a personalized fashion, by the time piece.

U.S. Pat. No. 5,995,456 ('456) by Brewer et al. teaches a watch having a multi color liquid crystal display, which dynamically changes by way of electronic control. Dynamic color changes within the LCD are presented in which perceived color changes occur in a pattern or sequence independent of the time of day. The apparatus may be adapted to provide various colored images such as geometric, images, designer labels, and logos on colored backgrounds. Color changes may occur in such a way that provides a dynamically changing image or a dynamically changing kaleidoscope effect. The apparatus provides color variation and allows the individual to alter the color appearance using a voltage regulating dial. However, the display itself is not designed to convey time of day information and teaches instead the use of background images. Accordingly, the rate, sequence, and pattern of color changes are independent to the passage of chronological time. Furthermore, the number and type of images presentable on the display are set by the manufacturer, and do not allow for interaction with a user of the display for customization purposes.

Further advances known in the art of time display can include the display of static picture elements for ornamentation purposes on the time display, as well as the display of messages containing alpha numeric words from a list of characters, as shown in U.S. Pat. No. 4,303,996 ('996) by Schmitz. However, the system taught does not allow the user to correlate the alpha numeric words with a passage of chronological time, and the location and presentation format of the alpha numeric characters is set by the manufacturer and not alterable by the user.

It is an object of the present invention to provide a customized time display to obviate or mitigate some of the above presented disadvantages.

SUMMARY OF THE INVENTION

The present invention is directed to a time display method and system for incorporating language, multi media, and animation into a time display device. The system can include typical features of a conventional time display device, such as an alarm function and a display face. The system can further include an embedded device for wireless communication, an operating system having windows capabilities, and application software for the device to enable a user to create thematic time displays. The software controls and compiles animation, multi media, language, type setting, schemas, identification, and sequencing of the display material, which can be obtained from a host website. The system is capable of downloading display material from the host website, and a user interface of the system can be used to provide a menu system, from which the user can select and coordinate the display of the downloaded material in a user customized fashion. The time display method and system helps the user or provider of the time displays to create and display a customized presentation of relative chronological data through a translation engine, such that the time presentation on the time display device provides the user with a personalized display, including selected images and/or language to represent the passage of numerical chronological data. By using such a time presentation system, the display software and corresponding device can help the user to customize the presentation of relative chronological data for providing a dynamic translated display of traditional time data in a predetermined sequence on the device, as specified by the user. The software and compatible display device can be used to select and display the passage of chronological data through the use of a time translation engine, so as to present a unique and personalized time display sequence.

According to one embodiment of the present invention there is provided a system for producing and displaying chronological data according to user specified parameters. The system comprises a user interface for monitoring the input of the parameters to a translation engine. The translation engine combines the parameters and a plurality of supplemental display data to provide a translation template. The translation template of the system is used to reformat the chronological data in a synchronized fashion to provide translated display data representing the chronological data. The system also includes a digital display device for monitoring a presentation of the translated display data on a display. The parameters and supplemental display data are alterable to customize the presentation of the translated display data on the display.

According to a further embodiment of the present invention there is provided a computer program product for producing and displaying chronological data according to user specified parameters. The product comprises a computer readable medium and a user interface module stored on the computer readable medium. The interface module monitors the input of the parameters to a translation module, which combines the parameters and a plurality of supplemental display data to produce a template module. The template module reformats the chronological data in a synchronized fashion to provide translated display data representing the chronological data. The produce also contains a display module for monitoring a presentation of the translated display data on a display.

BRIEF DESCRIPTION OF THE DRAWINGS

These and other features of the preferred embodiments of the invention will become more apparent in the following detailed description in which reference is made to the appended drawings by way of example only, wherein:

FIG. 2 shows example displays on a display device of the system of FIG. 1;

FIG. 8 shows example parameters of the engine of FIG. 3;

FIG. 10 is a lookup table for a sample schema of the engine of FIG. 3;

FIG. 11 is a further lookup table for a sample schema of FIG. 10; and

FIG. 12 is a further lookup table for a sample schema of FIG. 11.

DESCRIPTION OF THE PREFERRED EMBODIMENTS

Figure 1:
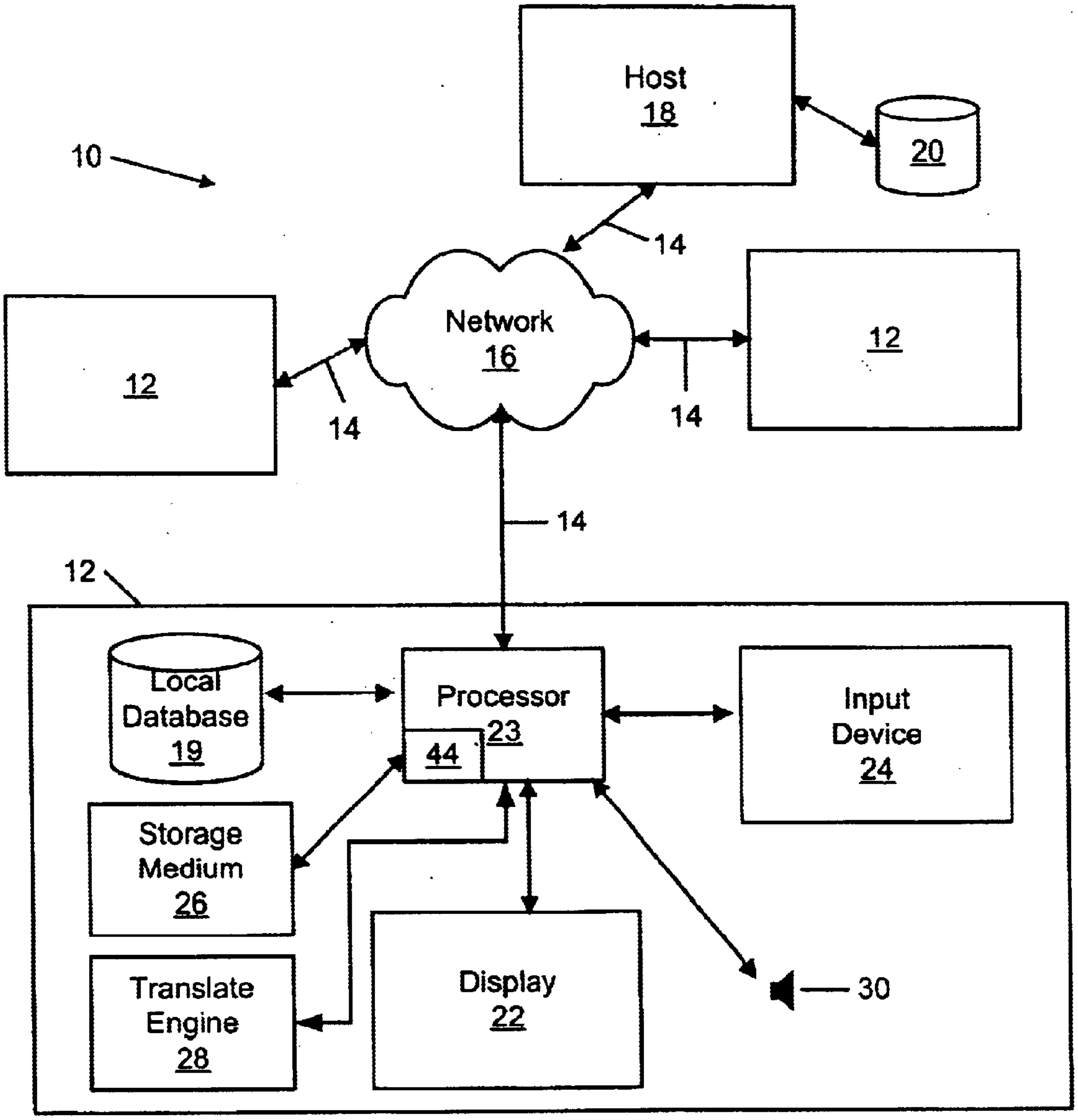
FIG. 1 is a block diagram of a time display system.

Referring to FIG. 1, a time display system 10 consists of a display device 12 coupled by a transmission channel 14 to a network 16. The device 12 communicates with a host 18, such as a time display web site, to access supplemental time display data 20 to be processed and then displayed on display 22 of the display device 12. The data 20 can contain alpha, numeric, and graphical image components related to chronological time. Some examples of networks 16 can include the Internet, microwave and antenna relay stations, satellite networks, other wireless communication systems, and composite networks comprising a mixture of these technologies. The device 12 uses the network 16 to access the time related data 20, which can be applied by the user to create personalized thematic time displays. The device 12 and related software is used to control and compile animation, multi media, language, type setting, schemas, and sequencing of the data 20 as directed by the user, for the in creation of the customized image display 22. The device 12 can include various electronic or digital devices, such as but not limited to an alarm clock, cellular phones, mobile computers, home computers, pagers, wristwatches, and other PDAs with an appropriate resolution display 22 for obtaining and coordinating the display of the data 20. Furthermore, the device 12 could coordinate the presentation of the display 22 as a computer desktop icon or ornament.

The time display device 12 is used by a user to create customized thematic time displays, on display 22, which translate chronological time data 44 and other data 20 into language and animation, wherein the display 22 is preferably a high resolution LCD display. The computer system of the device 12 comprises a processor 23 coupled to the host 18 through the network 16. The processor 23 monitors the download or transfer of the data 20 from the host site 18 to a local database 19 or memory of the device 12. The processor 23 is also coupled to the display 22 by a graphic controller and to user input devices 24, such as a keyboard, a mouse, or a voice activated device. If the display 22 is touch sensitive, then the display 22 itself can be the user input device 24. A computer readable storage medium 26 is also coupled to the processor 23 for providing an operating system or software (OS) to the device 12, wherein the OS can also be downloaded from the host 18 directly from the network 16. The OS could be specific to run or modify the operation of the device 12 in respect to the thematic time display functionality. It should be noted that the OS could be downloaded from the host 18 by another network device and then transferred to the device 12. The computer readable medium 26 can include hardware and/or software, such as by way of example only, magnetic discs, magnetic tape, optically readable media such as CD ROMs, and semi conductor memory such as PCMCIA cards. In each case, the medium 26 may take to form of a portable item such as a small disc, floppy diskette, cassette, or may take the form of a relatively large or immobile item such as a hard disc drive, solid state memory card, or RAM provided in the computer system of the device 12. It should be noted that the above listed example mediums 26 can be used either alone or in combination. It should also be noted that the content of the medium 26 could be used to supply time display data sets 20 to the processor 23 of the device 12, or that the content of the medium 26 could be obtained in the form of data files over the network 16 from the host 18.

The device 12 also includes a time translation engine 28, preferably in the form of software, which interacts with the processor 23 and time related data 20 stored in the local data base 19 to translate the chronological data 44 into a customized language and animation displays for presentation on the display 22. It should be noted, that audio displays of the data 20 could also be presented to the user through the use of a speaker 30. It should be noted that the user can also augment the data 20 with additional user created or independently obtained data suitable for presentation on the display 22. Furthermore, the user can also create time data or multimedia files and provide this to the host 18 for access by other users, as directed by the host 18.

Referring to FIG. 2, examples of visual time display are shown. Shown are two example presentation modes for the display 22, namely AlphaTime 32 comprising language and GuïTime 34 comprising a combination of language and/or animation. As shown in FIG. 2*a*, an example five minute time translation cycle is shown, wherein representational images 22*a, b, c, d, e*, and *f* are sequentially displayed on the display 22 in a synchronized fashion to indicate the passage of chronological time, for either the AlphaTime 32 or GuïTime 34 modes, as selected by the user. The display 22 can contain a language component 36 and a graphic minute indicator component 38. The indicator 38 can be used to indicate the passage of minutes or other time units (as specified by the user) with corresponding language or language and animation data 20, which can be predetermined images and/or animations as obtained from the host 18. Other examples of the indicators 38 are shown in FIG. 2*b*. The display 22 can include a frame 40 defined as an area which surrounds a main presentation area 42 of the display 22. The frame 40 can be represented by an image file or an animation file, as selected by the user from the data 20 supplied by the host 18. The background image of the display area 42 can be an image file or an animation file, which can be related through a thematic time display as specified by the user. The language component 36 of the time display 22 is comprised of a text translation of corresponding chronological data 44 (day/month/year) in a specified type face, which is supplied by the translation engine 28. For example, the indicated type face could be English Time foreign character sets. The user could also specify customized scripts and/or languages, as desired.

Referring to FIG. 2*c*, other sample displays are shown which can combine language with graphic images, such as the "Noon" image 46 on an alarm clock device 12, or an advertisement or message 48, which can be correlated to the particular time display sequence shown or cycled randomly throughout the sequence of time display images. The messages 48 can be images, animation, and video with audio capabilities. Furthermore, predetermined portions of the data, such as graphical images, can be associated with numeric serialization, which provides a unique identifier to each of the downloads containing corresponding graphical images. This serialization can be used by the user to monitor the number and/or type of images contained in the user's image collection. Accordingly, the use of serialization could coordinate the exchange of images and/or time displays represented by the downloads; or other multi media files 54 (see FIG. 3) between users. It should be noted that the users could create and serialize their own time display files or programs 60.

Figure 3:
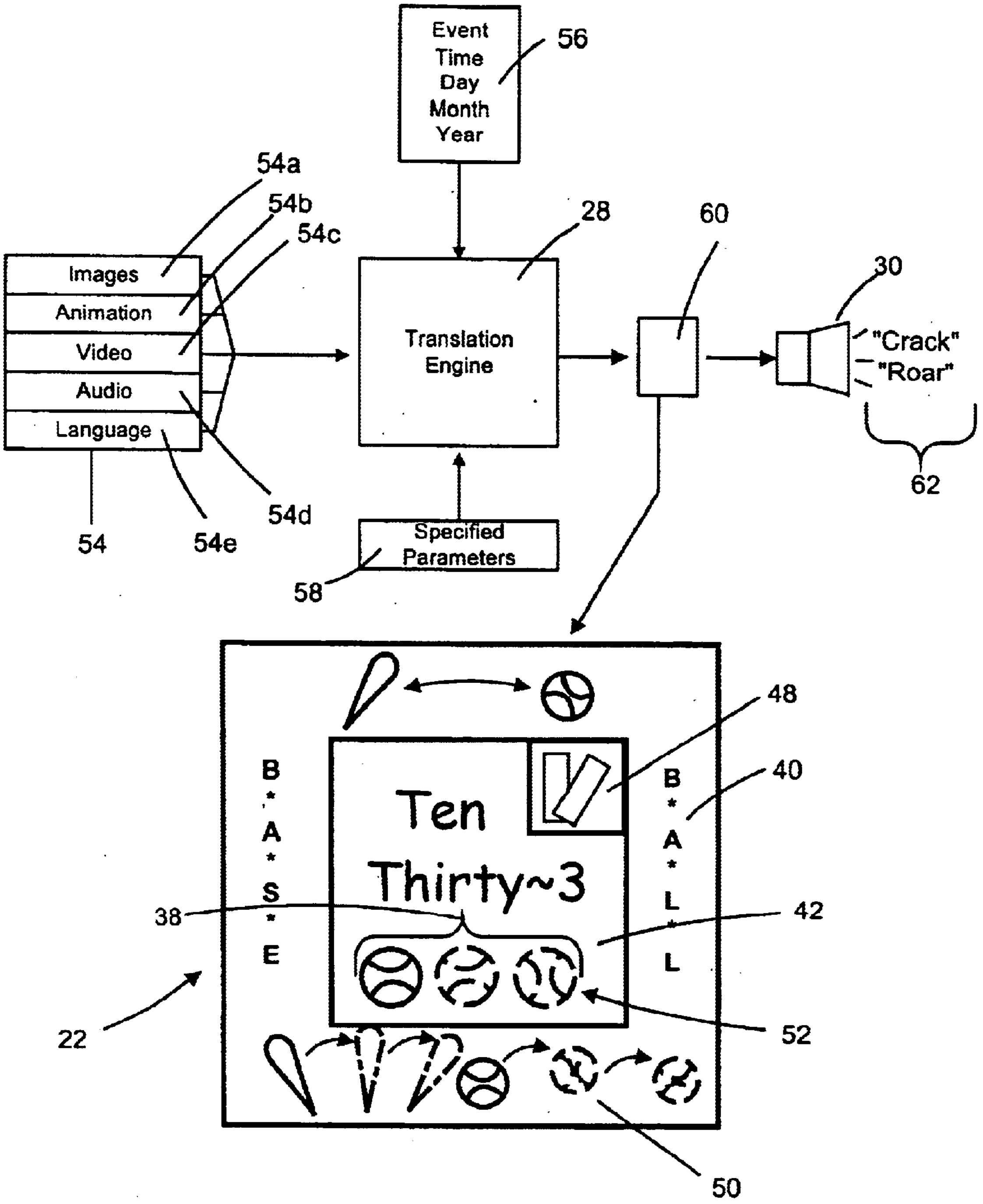
FIG. 3 presents operation of a time translation engine of FIG. 1.

Referring to FIG. 3, the translation engine 28 of the device 12 combines multi media files 54 obtained from the host 18, user specified parameters 58 obtained through the input device 24, and relative chronological data 56 as monitored by the processor 23 to produce a translated time display file or display executable program 60. Alternatively, the engine 28 could combine the parameters 58 and files 54 to produce a translation template 60, which could be used to reformat the data 56 for presentation on the display 22. The GuiTime time translation engine 28 receives system time 44 from the device 12 in a HR:MM:D/M/Y format. The translation engine 28 references a lookup table/flatfile/schema/database, as provided below, to determine how the time 44 is to be presented based on the user defined preferences 20. The translation engine 28 first determines whether the user has selected the GuiTime or Alpha Time format. The GuiTime format preferably presents using language and animation and the Alphatime format preferably uses language. The translation engine 28 then determines which language or schema translation has been selected by the user. As each minute lapses the translation engine 28 references and combines these two data sources 44, 20 and presents them as relative time on the display 22.

The processor 23 of the device 12 uses the OS obtained from the host 18 to execute the program 60 and otherwise monitor the sequencing of images contained in the program 60, in synchronization with the relative chronological data 56. For example, the user specified parameters 58 are for an alarm (i.e. Event) to be displayed by the display 22 once the chronological time reaches 10:33 AM on a user specified day of the year. For example, the thematic images and other time data 20 obtained by the user from the host 18 can include baseball images 54*a* and animation images 54*b*, along with baseball audio files 54*d* and language 54*e*. The translation engine 28 combines these selected thematic parameters 54, 58 along with the chronological data 56 obtained from the processor 23 to present the coordinated thematic time display program 60 on the display 22 and speaker 30. In particular, in this example, the time translation program 60 contains a "crack" of a bat and "roar" of the crowd as an auditory indicator 62 for the alarm, as well as animation sequences 50 and 52 located on the frame 40 and main display 42 of the display 22 respectively. The animation sequences 50, 52 provide to the user a sequential cartoon animation of a bat hitting a ball and flashing minute indicators 38 respectively. In addition, the advertisement section 48 can also contain ticket information for upcoming baseball games for example, in the user's geographical area and/or team(s) of interest.

It should be noted that the display 22 provides a dynamic time presentation to the user according to user the specified parameters 58, downloaded multi media files 54, and chronological data 56. The program 60 provides the user with user specified format of the chronological data 56 for presentation on the display 22 and/or speaker 30, which can include images 54*a*, animation 54*b*, video 54*c*, audio 54*d*, and language 54*e*. The program or template 60 is designed according to the user parameters 58 to compile the various components 54, 56 into thematic and user specified time display 22. Furthermore, the file 60 provides a sequential display of the alpha, numeric, and graphic components, with reference to user specified time units (such as minutes), for denoting the passage of time and event indication or reminders. Other functions configurable by the user can include alarm settings, day and date display, international languages, timers or countdowns, all of which can be displayed in a user customizable fashion through the translation engine 28 on the display 22 and/or speaker 30.

Referring to FIGS. 10, 11, and 12, sample lookup tables 210, 212, 214 used by the translation engine 28 show available relationships for the display 22. The translation engine can coordinate the reformatting of the time data 44 with the data 20 using any combination of work and/or numbers contained in the tables 210, 212, 214, as specified by the parameters 58 used to create the file 60.

Figure 4:
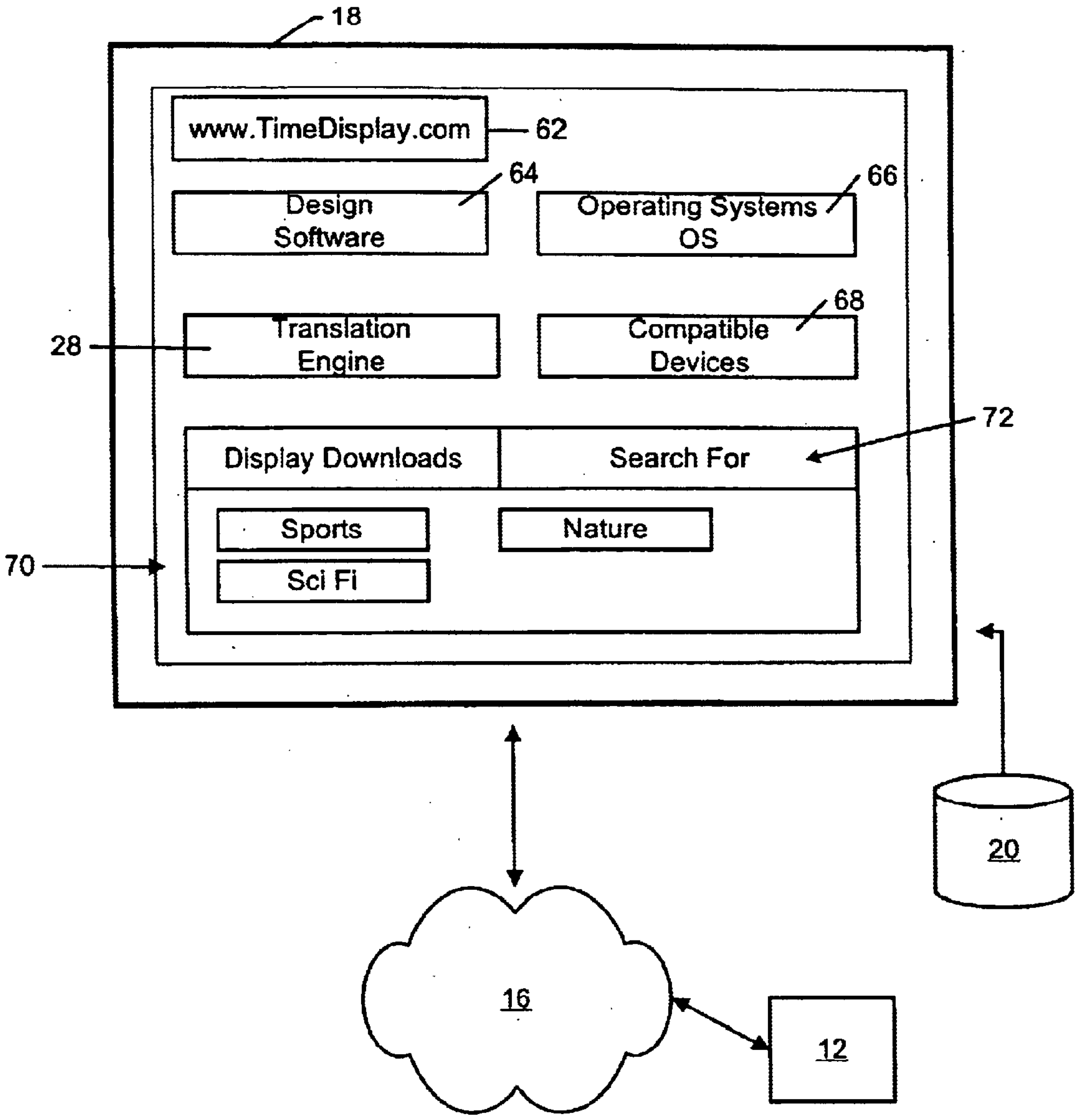
FIG. 4 show a host site of the system of FIG. 1.

Referring to FIG. 4, the host 18 can provide a website accessible by the user through a URL 62. The website 18 can include software downloads of the translation engine 28, design software 64, operating system software 66 for specified devices 12, and product and order information 68 for compatible devices for using the available operating systems 66. The design software 64 can be downloadable to the device 12 through the network 16 and can be used to compile the multi media files 54, as well as coordinate the animation, language, type setting, schemas, and serialization by the user to produce the time translation program 60.

The host site 18 also contains a display download section 70 with an accompanying search engine 72. The access of the data 20 through the download interface 70 can be coordinated into various categories, such as but not limited to sports, science fiction, and nature. The download data 20 from the section 70 is in the form of multi media file 54 (see FIG. 3) as input for the translation engine 28. The image files 54*a* comprise images which can be used to populate the frame 40 and background 42 sections of the display 22, as well as provide language 36, ad/messages 48, minute indicators 38, AM/PM indicators, and alarm indicators. The animation files 54*b* can be used to populate the frame 40 and background 42 sections of the display 22, as well as supply presentation material for the ad/messages section 48, content of the minute indicator 38, AM/PM indicators, and alarm indicators. The video files 54*c* obtainable from the download section 70 can be used to populate the background 42 and ad/messages section 48. The audio files 54*d* can be used to supply display data 20 for the ad/messages section 48 and alarm settings, which are indicated to the user through the speaker 30 of the device 12. Furthermore, separate language files 54*e* can be obtained from the download section 70 to provide the user with varying language formats for both the AlphaTime 32 and GuiTime 34 display modes.

Figure 5:
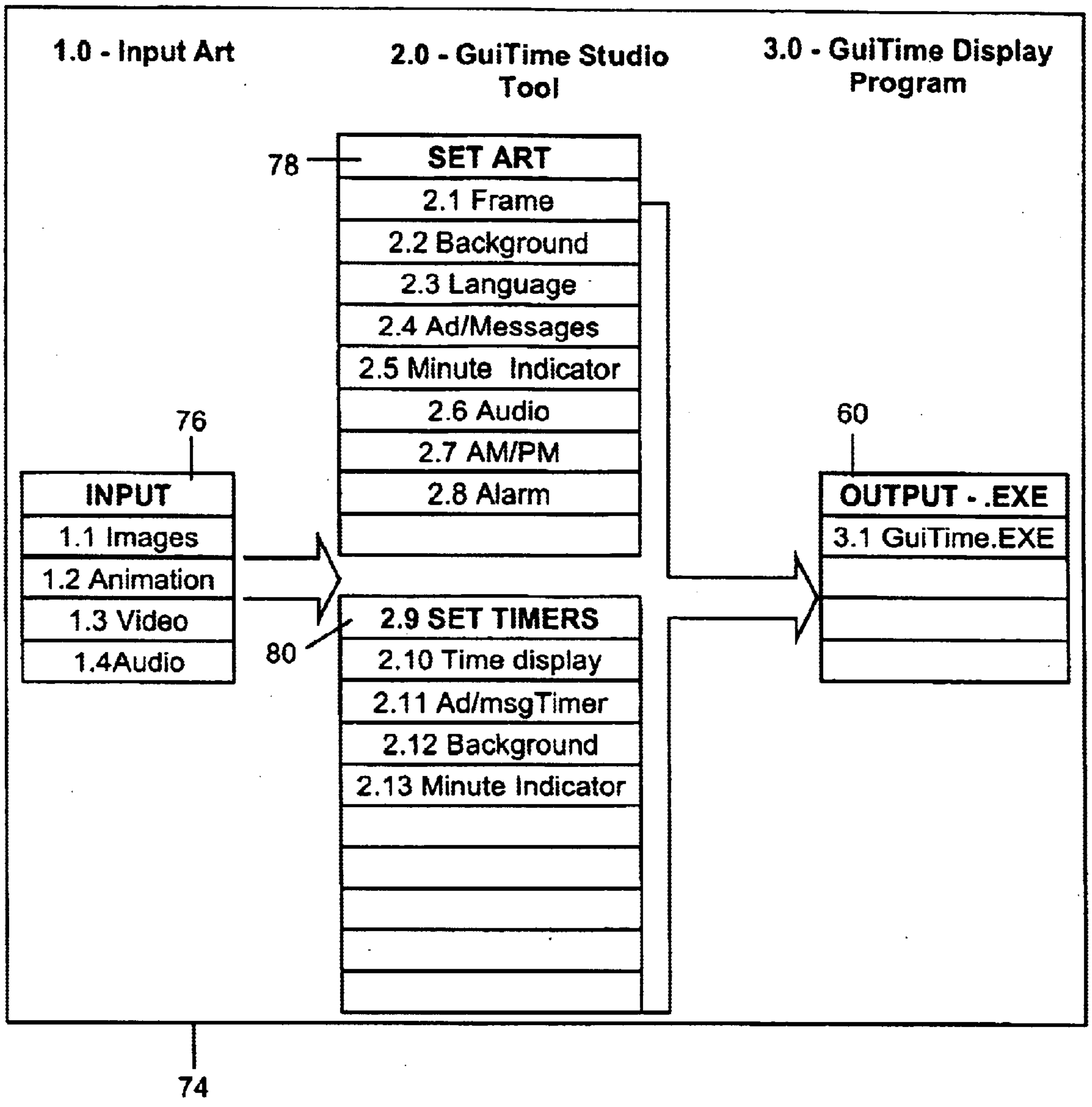
FIG. 5 is an operational flowchart of the system of FIG. 1.

In operation of the system 10, referring to FIG. 5, once the user has downloaded and installed the design software 64, operating systems software 66, and translation engine software 28 onto their device 12, the device 12 can be ready to download the display time data 20 through the interface 70. Once the data 20 has been downloaded by the user to the device 12, the installed design software 64 can be used to place or otherwise order the selected or download files 54 and time display components therein in user specified sequences, as well as how to coordinate the timing of and in what manner and in what sequence in relation to the chronological time the individual files 54 will be played or displayed on the display 22 of the device 12, by entering the specified parameters 58. The user can access a graphical user interface 74 (see FIG. 5) generated by the design software 64, which provides a series of menus 76, 78, 80 to customize the presentation of the files 54 on the display 22.

The input menu 76 allows the user to define the parameters 58 to select which of the files 54 are to be included on the display 22. The Frame item can be selected from the set art menu 78, by which the user defines the parameters 58 to indicate the downloaded file(s) 54 which will be associated with the frame space 40 of the display 22. Selection of the Background item from the menu 78 allows the user to indicate the files which will be associated with the background space 42 of the display 22. Selection of the Language item from the menu 78 allows the user to select the particular language files 54*e* which will appear on top of the background 42 as time indicators 36. The language file 54*e* selected through the Language item references the file comprised of a text translation of the corresponding time of day in the indicated type face, such as English Times Roman, French Helvetica Script, and German Helvetica handwriting. Selection of the Ad/Messages item from the menu 78 allows the user to specify the files 54 which will be associated with the advertisements or messages that are cycled through the time display 22. These messages 48 can be images, animation, and/or video with audio capabilities. Selection of the Minute Indicator item from the menu 78 allows the user to indicate which files 54 will be associated with the type of minute indicators 38 and their manner of placement on the display 22. Selection of the Audio item from the menu 78 allows the user to indicate the files 54 which will be associated with the selected videos, animations, and ads or alarm events displayed in the frame section 40 and main section 42 of the display 22. Selection of the AM/PM item from the menu 78 allows the user to identify the files 54 which will be associated with the AM/PM indicator, which can be represented by an animation or stationary image. Selection of the Alarm item from the menu 78 allows the user to specify the alarm sequence and representative indicator from the files 54 which will be associated with the alarm indicator displayed on the display 22 and the data sequence which plays when the alarm is activated. The alarm indicator files 54 can be a combination of animation, or image and the alarm sequence can consist of animation, images, video, and/or audio.

Furthermore, in reference to FIG. 5, the user can also reference a Set Timers menu 80 from the interface 74. The Timer menu 80 allows the user to set the parameters 58 for how long a particular time segment is displayed on the device 12 and how long an ad message 48 appears in the display 22. This timer function also allows the user to indicate intervals in which selected background files and minute indicators 38 will be displayed. Selection of the Time Display item from the menu 80 allows the user to set the duration of the time, for example in seconds, that the display 22 will present selected files 54 indicating chronological time to the user on the display 22 before being replaced or cycled with alternate selected files. Selection of the Ad/Message item from the menu 80 allows user to set the duration of the time, for example in seconds, that the display 22 will present ad information in the region 48. Selection of the Background item from the menu 80 allows the user to set the duration of the time that the display 22 will display the selected background files 54. In particular, for each background file 54 indicated in the Set Art menu 78, the user can indicate the start and stop time in a DD/MM/YY: HR: MM format so that particular thematic time displays can be appropriately cycled by the user for presentation on the display 22. Selection of the Minute Indicator item by the user from the menu 80 allows the user to set the duration of the time that the display 22 will display the selected minute indicators 38. For each minute indicator file 54 specified from the menu 78, the user can indicate the start and end time of the minute indicators 38 in a DD/MM/YY: HR: MM format, such that the indicators are present during the time presentation on the display 22. Accordingly, once the user has finished placement of various downloaded files 54 using the menu 76, the design software 64 then compiles the files and user input into the executable file 60. Once the user has completed a particular file 60, the user can save the file 60 to the database 19 as currently configured for future reference.

Figure 9:
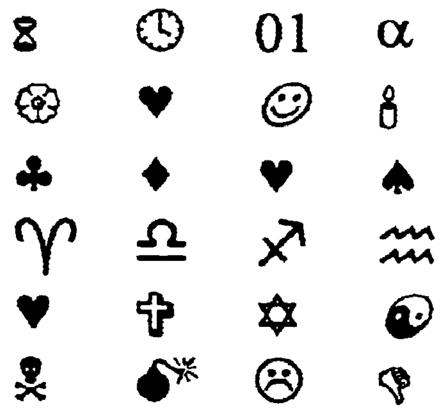
FIG. 9 is a further example of the parameters of FIG. 8.

Referring to FIGS. 8 and 9, example variable definitions are shown at 200. The user selects from the definitions shown in table 202. The user can select any combination of the variables contained in each column of the table 202. For example, the user can select: a presentation format $P_x=P_1$; a schema or lookup table (see FIGS. 10, 11, and 12)$=$4 Cool; a schema for the type of icon desired to represent the minute indicator 38 such as isx + is 2 Globe; an icon group selection such as ix=i2=(ic1+ic2), which cycles the minute indicator represented by ic1 and ic2 on the display 22; the particular icon selected such as icx=1 from the group isx; a specified border such as F=F1 Wood Nub; and a specified background such as B=B1 Brick Wall. Any combination of variables can be selected from the table 202 to produce the presentation template parameter set 204, which is included in the file 60, thereby providing the thematic time display customization. FIG. 9 shows the relation of specific icons 206 to the icon parameters icx in sample fields 208 corresponding to table 202. It should be noted that graphical or image parameters may not be used for Alphatime formats of the display 22.

Figure 6:
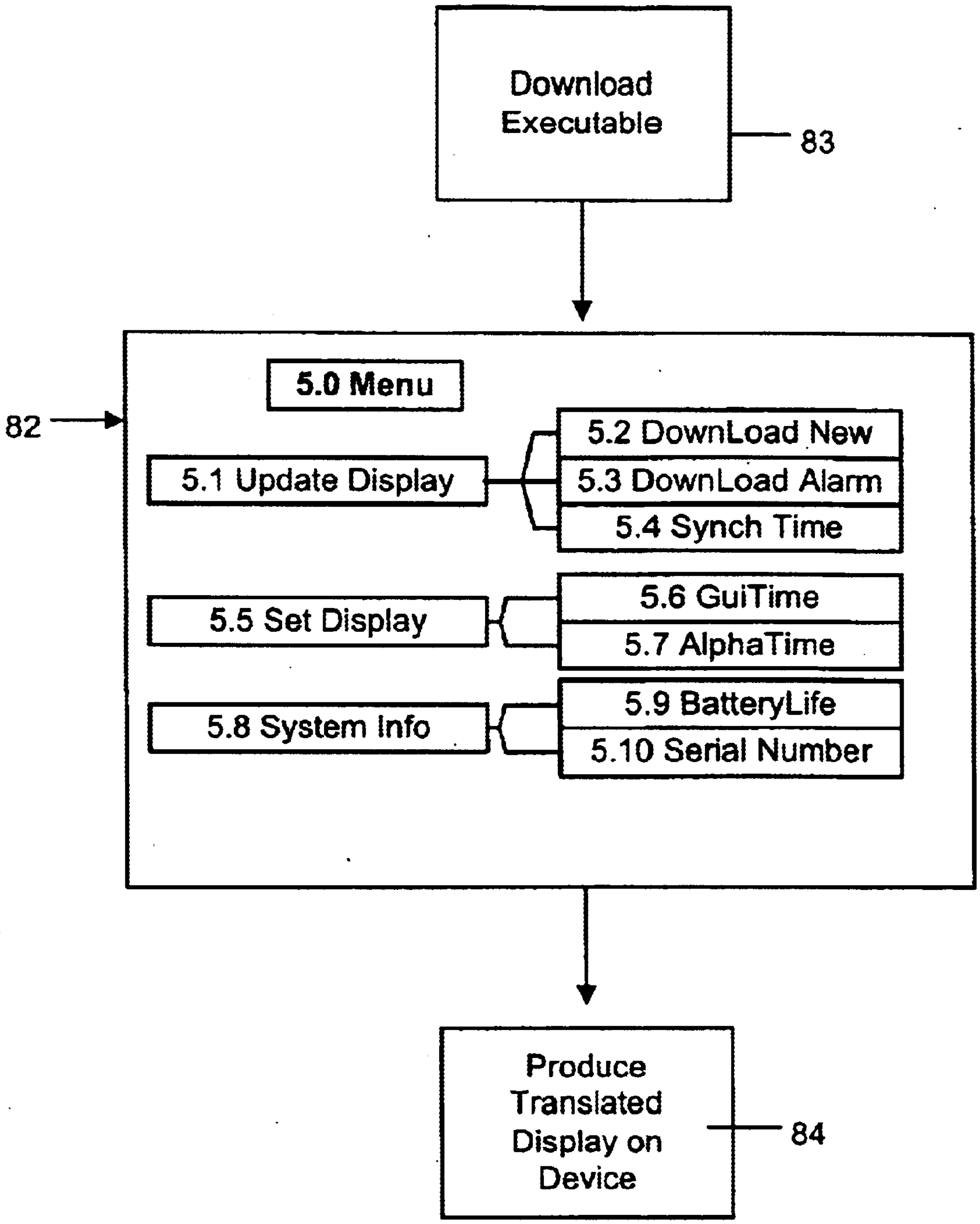
FIG. 6 is a further operational flowchart of the device of FIG. 2.

Referring to FIG. 6, once the executable file 60 has been downloaded 83 to the processor 23 of the device 12, a device menu interface 82 is provided to the user which allows the device to download new displays, synchronize time, de-active/active alarms, and select the display mode of the display 22, thereby altering the file 54 contents and parameters 58. Selection of the Update Display item from the menu 82 allows the user to download a new display or altered display program or template 60, as previously created by the user. Furthermore, user specified alarm settings can be reviewed and modified, as well as allowing the user to synchronize the device time 12 as monitored by the processor 23 with an external time standard. Selection of the set Display item from the menu 82 allows user to toggle the display mode from either the GuiTime 34 or AlphaTime 32 formats. Selection of the System Info item from the menu 82 allows the user to check remaining battery life of the device 12 and the serial number or title of the currently loaded display. Once the items from the menu 82 have been customized to the user's satisfaction, the user customized presentation 84 of the files 54 in combination with the chronological data 56 on the display 22 will continue until either the current program 60 is terminated or until such time that the user creates and downloads a new program 60 to the display device 12.

Figure 7:
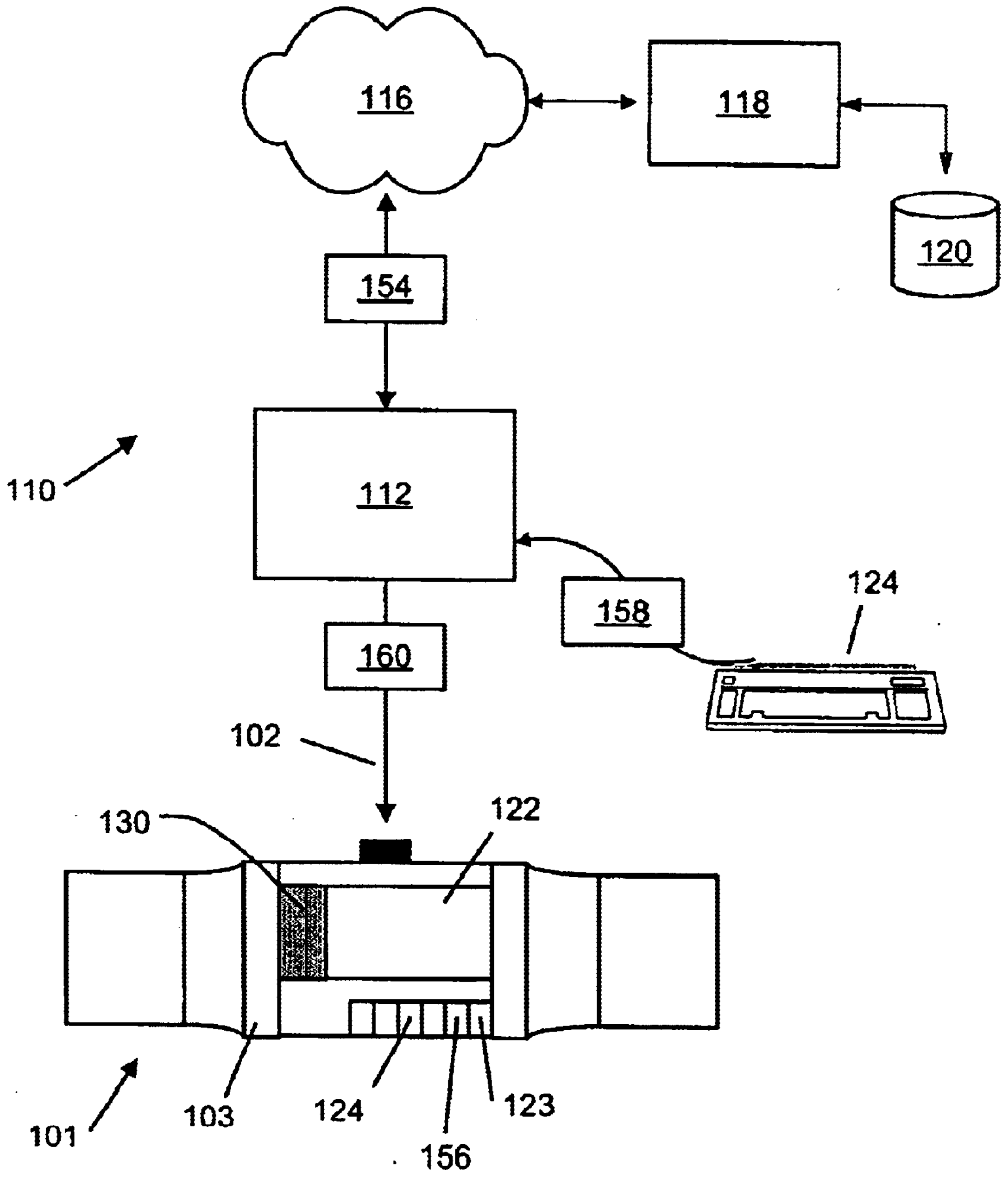
FIG. 7 is a further embodiment of the system of FIG. 1.

Referring to FIG. 7, a further embodiment of the system 10 is described, wherein like numerals with a prefix "1"

denote similar components to those contained in FIG. 1. A system 110 comprises a computer 112 to interact with a host system 118 through a network 116. The computer 112 co-ordinates the download of time related data 120 and formats the data 120 according to user specified input 124, to produce an executable time translation template 160 to a self-contained time presentation device 101. The device 101 consists of an embedded system with communication capabilities to the device 112, a high resolution color LCD display 122, a speaker 130, a user interface 124, and a power source 103. The device 101, for example a watch, contains an operating system for monitoring all I/O functions as well as a display driver and device interfaces controlled by a processor 123. For example, the embedded display 122 would have a diameter of approximately 0.8 inches in size with a high resolution display. The embedded processor would control and drive the output and resolution of the display 122. The user interface 124 of the device 101 would be used by the user to engage the menu system for downloading a new display, synchronizing time, deactivation/activation of alarms, and the selection of either the GuiTime mode 34 or AlphaTime display mode 32. The speaker 130 is used to indicate system messages and alarms as well as to play audio files associated with the executable template 160. Preferably, a communication interface 102 between the self-contained watch 101 and computer 112 is a wireless solution, as is known in the art.

In operation of the embodiment of FIG. 7, the computer 112 is used to download multi media files 154 from the host 118 and to format the presentation of the alpha, numeric, and graphic components of the data 120 contained therein according to user specified parameters 158. The computer 112 can access the host 118, and the browse and download a selection of display data sets 120. The computer 112 then produces customized time translation data in the form of the file 160 as a template, which is then downloaded to the watch 101. Accordingly, through a simplified set of interface parameters through the interface 124 of the device 101, the user can co-ordinate the chronological data 156 of the device processor 123 along with the template 160 for presentation of thematic time displays on the display 122. It should be noted that the computational capabilities of the device 101 can be reduced to interacting with the template 160 in combination with synchronized chronological data 156. In contrast, the computer 112 resources can be used for connecting with the host 118 over the network 116 and coordinating the download of data 120, as well as formatting of the data 120 according to user specified parameters 158 to produce the resultant executable template 160, which is executed by the device 101.

Accordingly, as shown above by example, the display format 22 of the system 10 can be customized to display various pre-determined time sequences and formats as directed by the user through downloadable files 54 from the host site 18, representing time display data 20. This manipulation and translated display format of relative chronological time data helps the user to provide a dynamic and customizable time display 22, by using various customization features, as indicated by example in the customization menus of FIGS. 4, 5, and 6. It is recognized that the operation of the system 10 can be provided by time display software containing the above system features as software modules.

Although the invention has been described with reference to certain specific embodiments, various modifications thereof will be apparent to those skilled in the art without departing from the spirit and scope of the invention as outlined in the claims appended hereto. It is recognized that the system 10 features can be represented as software and/or hardware modules as represented by the computer readable media 26. It is further recognized that the related software to control and compile the presentation of the data 20 can reside on; the host 18, so that the user could configure the executable file 160 from user selection off of the host website; the host 18 which provides a series of pre-configured downloadable files 60, 160 related to the variety of display formats selectable by the user; and software downloadable by the user from the host 18, such that the user can configure and compile their own personalized time displays for presentation on the device 12.

The embodiments of the invention in which an exclusive property or privilege is claimed are defined as follows:

1. A system for representing chronological data according to user specified graphic image parameters, the system comprising:

a) an interface for monitoring the input of the image parameters to a translation engine;

b) the translation engine for integrating the image parameters and a plurality of supplemental display data to provide a translation template, said image parameters representing intervals of a predetermined number of minutes, and said supplemental display data representing individual minutes within the intervals;

c) the template for reformatting the chronological data in a synchronized fashion by combining the image parameters and the chronological data to provide translated display data representing modified chronological data; and d) a digital display for sequential presentation of the translated display data to the user, the sequential presentation providing a first display indicating one of the intervals and a second display indicating of one of the individual minutes within the interval;

wherein the image parameters and supplemental display data are alterable to customize the presentation of the modified chronological data on the display as the translated display data to represent a passage of time.

2. A system according to claim 1 further comprising a menu provided by the user interface for relating the image parameters to the supplemental display data for subsequent modification of the chronological data.

3. A method for representing chronological data according to user specified graphic image parameters, the method comprising the steps of:

a) selecting the image parameters and a plurality of supplemental display data by the user; said image parameter representing intervals of a predetermined number of minutes, and said supplemental display data representing individual minutes within the intervals;

b) integrating the image parameters and the plurality of supplemental display data to provide a translation template;

c) reformatting the chronological data with the template in a synchronized fashion by combining the image parameters and the chronological data to provide translated display data representing modified chronological data; and d) presenting the translated display data sequentially on a display, the sequential presentation providing a first display indicating one of the intervals and a second display indicating of one of the individual minutes within the interval;

wherein the image parameters and the supplemental display data are alterable to customize the presentation of the modified chronological data on the display as the translated display data to represent a passage of time.

4. A computer program product for representing chronological data according to user specified graphic image parameters, the product comprising:

a) a computer readable medium;

b) an interface module stored on the computer readable medium for monitoring the input of the image parameters;

c) the translation module for integrating the image parameters and a plurality of supplemental display data to provide a template module, said image parameters representing intervals of a predetermined number of minutes, and said supplemental display data representing individual minutes within the intervals;

d) the template module for reformatting the chronological data in a synchronized fashion by combining the image parameters and the chronological data to provide translated display data representing modified chronological data; and e) a display module for sequential presentation of the translated display data to the user, the sequential presentation providing a first display indicating one of the intervals and a second display indicating of one of the individual minutes within the interval;

wherein the image parameters and supplemental display data are alterable to customize the presentation of the modified chronological data on the display as the translated display data to represent a passage of time.

5. The system according to claim 2, wherein the image parameters contain picture data.

6. The system according to claim 2, wherein the image parameters contain alpha character data.

7. The system according to claim 2, wherein the image parameters contain alphanumeric character data.

8. The system according to claim 5, wherein the image parameters are used to reformat alpha character data for subsequent modification of the chronological data by the template.

9. The system according to claim 1, wherein the system is implemented on a portable timepiece.

10. The system according to claim 5, wherein the system is implemented on a portable timepiece.

11. The system according to claim 5, wherein the template represents a plurality of defined translation criteria for application to the chronological data to produce the modified chronological data.

* * * * *